Dec. 27, 1932.    J. BAILEY    1,892,126
METHOD OF AND MEANS FOR WORKING GLASS
Filed Nov. 30, 1929    4 Sheets-Sheet 1
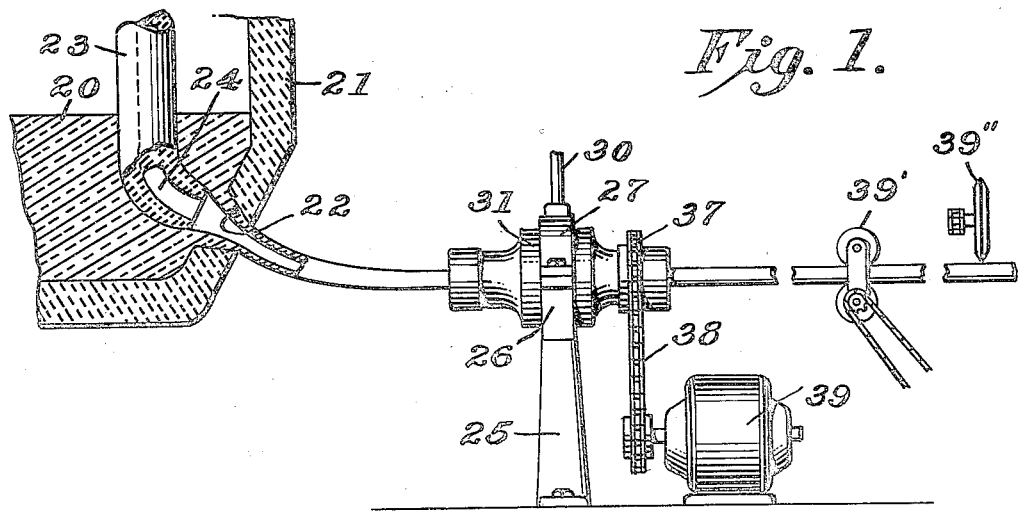
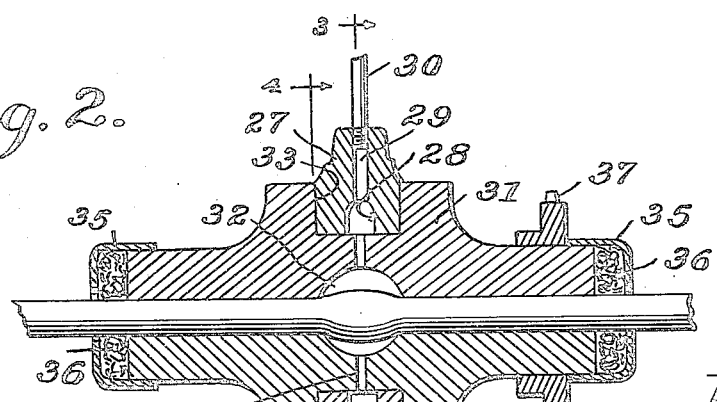
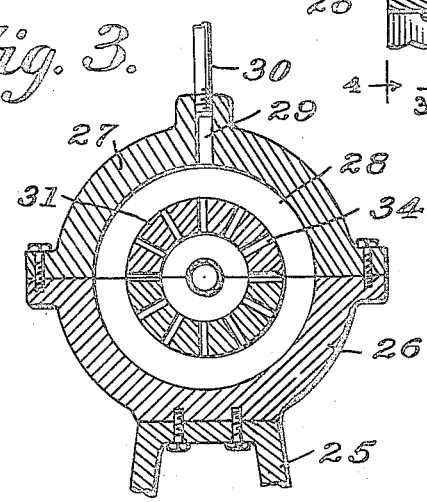
INVENTOR
JAMES BAILEY.
BY
ATTORNEYS.

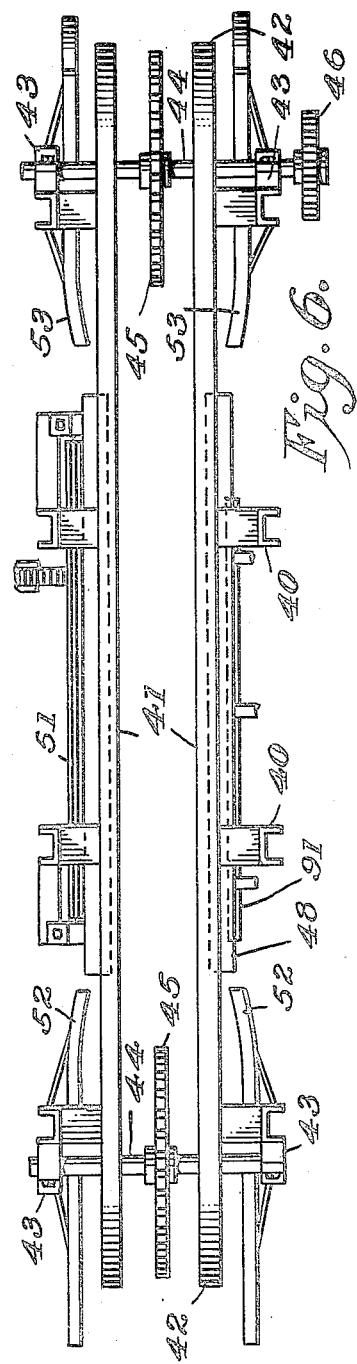
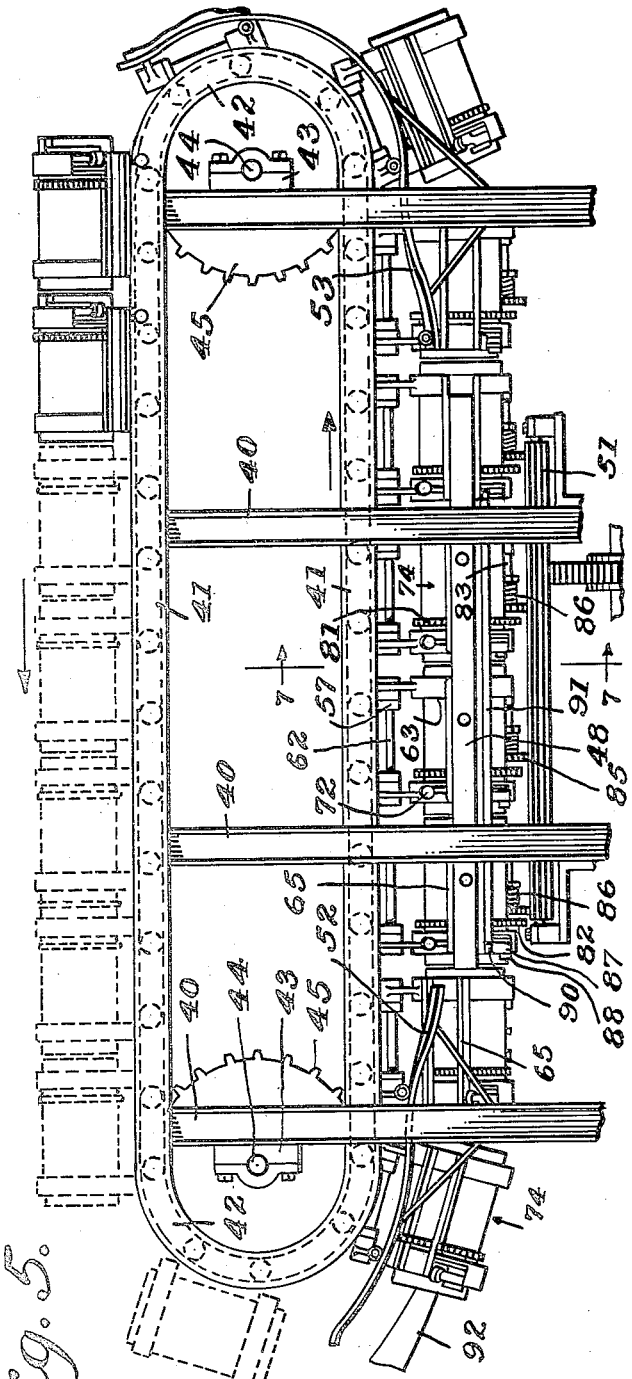

Dec. 27, 1932.  J. BAILEY  1,892,126
METHOD OF AND MEANS FOR WORKING GLASS
Filed Nov. 30, 1929    4 Sheets-Sheet 3
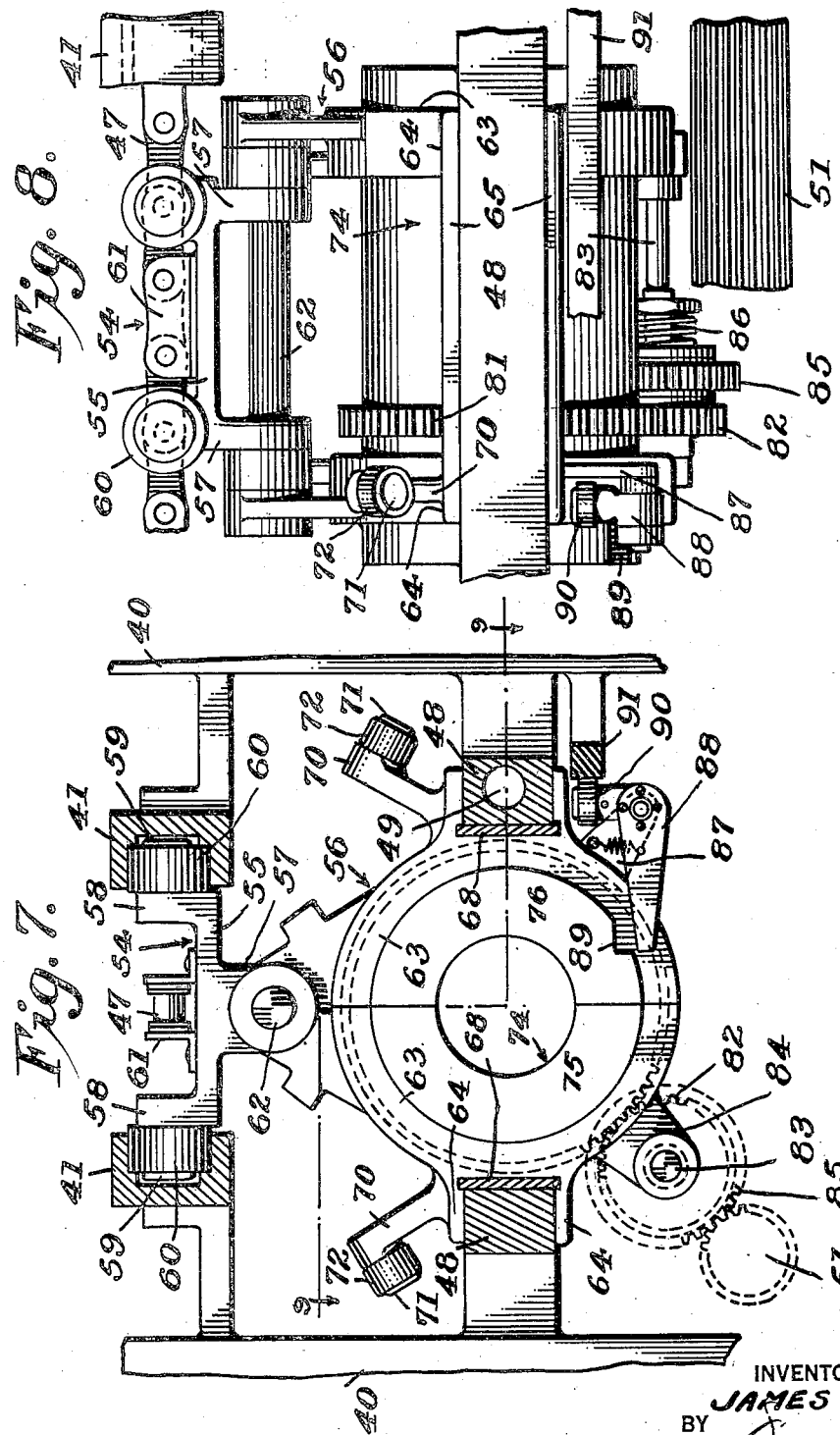
INVENTOR
JAMES BAILEY.
BY
ATTORNEYS.

Dec. 27, 1932.   J. BAILEY   1,892,126
METHOD OF AND MEANS FOR WORKING GLASS
Filed Nov. 30, 1929   4 Sheets-Sheet 4
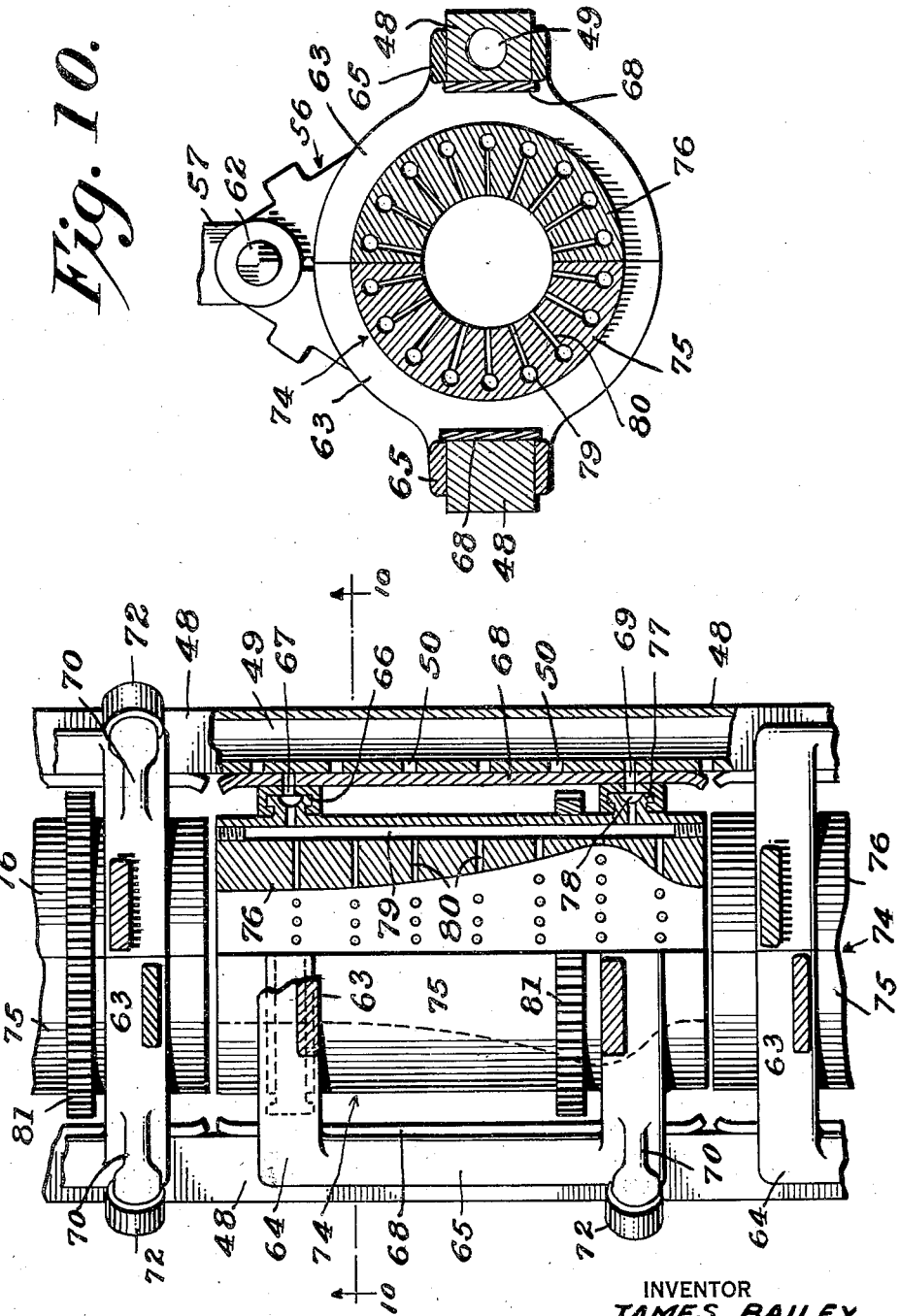
INVENTOR
JAMES BAILEY.
BY
ATTORNEYS Patented Dec. 27, 1932

1,892,126

UNITED STATES PATENT OFFICE

JAMES BAILEY, OF CORNING, NEW YORK, ASSIGNOR TO CORNING GLASS WORKS, OF CORNING, NEW YORK, A CORPORATION OF NEW YORK

METHOD OF AND MEANS FOR WORKING GLASS

Application filed November 30, 1929. Serial No. 410,799.

This invention relates to a method of and means for working glass and more particularly to the manufacture of hollow glass articles.

Heretofore hollow glass articles such as tubing, lamp bulbs, and flasks have all been made by what is commonly known as "blowing", that is, the expansion of the soft glass by air pressure into molds of suitable shape and size. In blowing glass articles, the glass is gathered on the end of a blow iron and after having reached the proper consistency, it is introduced into a mold which is closed at one end so as to confine the air within the glass and cause the latter to expand into and conform to the shape of the mold. In blowing tubing, glass is gathered upon a blow iron and the end of the gather opposite that which is attached to the blow iron is attached to a punty. Air is then introduced through the blow iron into the gather and the bubble thus formed is drawn out to the desired length and diameter as the blowing continues. In this process the glass which adheres to the punty forms a dam which confines the blowing air to the bubble. Hence when blowing glass articles it becomes obvious that some means to prevent the escape of air from within the glass must be employed. This is accomplished when making machine-drawn tubing by locating the cut-off mechanism for the tubing a great distance from the point of draw so that a back pressure is built up within the long length of finished tubing. This is uneconomical as such tube drawing apparatus frequently requires floor space from one hundred to two hundred feet in length. Moreover, a slight difference in the viscosity of the glass issuing from the melting furnace will cause variations in the diameter of the tubing being drawn, hotter glass producing tubing of greater diameter than cooler glass. Consequently, unless exceedingly accurate temperature control is maintained, the tubing so produced will vary in diameter.

The primary object of the present invention is to produce articles and tubing of accurate size.

Another object is to maintain continuous production of glass articles directly from molten glass flowing from a parent body.

A further object is to effect economies in the amount of floor space required to carry on the various operations, particularly tube drawing operations.

The above and other objects may be attained by the use of my invention which embodies among its features the flowing of molten glass from a parent body directly into a mold, the shaping of the glass while in the mold by exhausting the air between the glass and the mold and the discharging of the completed articles from the mold in a continuous uninterrupted process while they are still attached to the parent body of molten glass. Other features include the expanding of the glass while in the mold and the subsequent drawing of the glass down to size by contact with the mold walls.

In the drawings:

Fig. 1 is a side view of one embodiment of my invention showing it in operative position with relation to a forehearth;

Fig. 2 is an enlarged longitudinal sectional view through the glass shaping mold shown in Fig. 1;

Fig. 3 is a transverse sectional view taken on the line 3—3 of Fig. 2;

Fig. 4 is a similar view taken on the line 4—4 of Fig. 2;

Fig. 5 is a side view of a modification of my invention;

Fig. 6 is a plan view of Fig. 5 showing portions removed for better illustration;

Fig. 7 is an enlarged transverse sectional view taken on the line 7—7 of Fig. 5;

Fig. 8 is a side view of Fig. 7;

Fig. 9 is an enlarged longitudinal sectional view taken on the line 9—9 of Fig. 7; and Fig. 10 is a sectional view taken on the line 10—10 of Fig. 9.

In carrying my invention into practice molten glass 20 contained in a forehearth 21 is allowed to flow through an orifice 22 toward the mold mechanism being employed. In order to govern the flow of glass through the orifice, I find it desirable to introduce refractory needle 23 which is provided with a longitudinally extending air passage 24, such needles being commonly employed in the various types of glass feeding devices.

In the production of tubing, the mold mechanism illustrated in Figs. 1 to 4 inclusive is used and consists of a pedestal 25 supporting at its upper end the lower half of a bearing member 26 in which the mold body rotates. The upper half of the bearing member which is designated by the numeral 27 is removably secured in any suitable manner to the lower half 26 and both the upper and lower halves are provided on their inner faces with grooves 28 for a purpose to be more fully hereinafter described. A passage 29 is formed in the upper half 27 with its lower end communicating with the groove 28 while its upper end is internally screw threaded to receive a pipe 30 which is connected with any suitable exhausting means for exhausting the groove 28.

Rotatably mounted in the bearing member is a mold 31 which consists of an elongated tubular body formed intermediate its ends with an internal annular chamber 32. An external annular groove 33 is formed intermediate the ends of the tubular body for the reception of the upper and lower halves 27 and 26 of the bearing member and radial openings 34 establish communication between the groove 33 and the chamber 32 as will be clearly seen upon reference to Figs. 2 and 3. Fitted on opposite ends of the tubular body are caps 35 which serve to retain a suitable packing material 36, such as shredded asbestos, in place and a sprocket 37 is attached to the mold 31 in any suitable manner and is driven by means of a chain 38 running over a sprocket of the drive shaft of a suitable power source such as a motor 39.

As illustrated in Fig. 1, molten glass issuing from the orifice 22 is fed through one end of the mold 31 and discharges from the opposite end in the form of a tube of uniform diameter. The uniformity of diameter is produced by the exhaustion of the air from the groove 32 and the consequent reduction of pressure on the outside of the tube so that while the glass is still molten, it is partially expanded under the influence of atmospheric pressure into the groove 32 and subsequently will be drawn down to the proper diameter by engagement with the wall of the mold. Hence it will be seen that it is unnecessary to maintain a predetermined pressure within the tube. A tractor and cut-off mechanism 39' and 39'' respectively, of a construction such as is now commonly employed in the production of tubing and cane, is located relatively close to the discharge end of the mold 31 and great economies in floor space may thus be effected. Due to the fact that the expansion of the tubing does not take place until it enters the mold, the diameter of the tubing is definitely controlled by contact with the mold walls so that tubing of accurate size may be rapidly produced, irrespective of minor changes in the temperature conditions of the molten glass issuing from the orifice.

In the modification of my invention illustrated in Figs. 5 to 10 inclusive, molten glass is fed from a parent body as previously described but instead of passing through the mold mechanism as above described, it enters a mold which travels with it for a predetermined distance and then opens to discharge a completed article. This naturally requires a somewhat more complicated mechanism, though the processes involved are essentially the same as those described above.

In Figs. 5 to 10, I have illustrated such a mechanism embodying a frame which consists of suitable standards 40 and the necessary cross bars, tie bars and the like which cooperate with the standards to provide a suitable support for the rest of the mechanism. The standards 40 support horizontally spaced longitudinal track rails 41 which are connected at their ends by return bends 42. In the present embodiment of my invention these track rails and return bends consist of transversely U-shaped channel bars, the flanges of which are disposed horizontally and in such position that those on one side of the machine extend toward those on the opposite side and thus form track grooves in which mold supporting carriages run. Mounted in suitable bearings 43 supported near opposite ends of the frame, are shafts 44 carrying sprockets 45 and one of these shafts is extended beyond the side of the machine and carries a drive sprocket 46 (Fig. 6) which is connected to any suitable power source. A mold carrier driving chain 47 (Fig. 8) is trained over the sprockets 45 and is connected to suitable mold carriages as will be more fully hereinafter described. Secured to certain of the standards intermediate the ends of the device and below the lowermost track rail 41 are guide rails 48 which terminate short of the ends of the machine as will be clearly seen upon reference to Fig. 5. One of these guide rails is provided with a longitudinal passage 49 and branch passages 50 (Fig. 9). Rotatably mounted in suitable bearings near opposite ends of the machine is a toothed cylinder 51 whose axis is disposed longitudinally of the frame. This cylinder is slightly shorter in length than the guide rails 48, though it extends coincidently with said rails. Any suitable driving means may be used to impart rotation to the cylinder. Secured to the frame beyond the ends of the guide rails 48 and the cylinder 49 are mold closing and opening cams 52 and 53, respectively.

Mold supporting carriers 54 are arranged to traverse the closed path formed between the track rails 41 and return bends 42 and each of these mold carriers consists of a carriage 55 and a mold support 56. The carriage 55 is provided adjacent opposite ends with depending bosses 57 from which the mold support is suspended. Upstanding bosses 58 are formed adjacent opposite ends of the carriage and each of the latter is provided with a trunnion 59 upon which a roller 60 is rotatably mounted As illustrated in Fig. 7, these rollers are disposed between the flanges of the track rails 41 in such a manner that the carriages may be moved longitudinally along the track rails but motion in other directions is prevented, it being understood that such longitudinal motion is produced by the chain 47, certain links of which are attached by brackets 61 (Fig. 8) to the carriages. Extending longitudinally through the bosses 57 is a pivot pin 62 which projects beyond the ends of the carriage 55 and supports the mold support 56. The latter comprises a pair of sections hingedly supported by the pivot pin 62 and arranged to open and close by swinging around the longitudinal axis of the pivot pin to facilitate the discharge of articles from the molds. Each of these sections is composed of a skeleton frame consisting of a pair of semi-circular members 63 formed with outstanding spaced lugs 64 intermediate their ends which latter are connected by longitudinally extending webs 65. A rabbeted groove 66 (Fig. 9) is formed in each of the semicircular members for a purpose to be more fully hereinafter described and formed in each semi-circular member midway between the lugs 64 are openings 67. Shoes 68 are supported between the lugs 64 and extend longitudinally along each side of the mold support as illustrated in Fig. 9. These shoes are provided with openings 69 which align with the openings 67 above referred to, in order that communication may be established between the grooves 66 and the exterior of the mold support. Extending upwardly and outwardly from the semi-circular mold embracing members at one end of the mold support are brackets 70 which are provided adjacent their outer ends with trunnions 71 upon which rollers 72 are rotatably mounted and suitable stops 73 are formed on the mold embracing members for engagement with the carriage during the return run of the mold.

A mold designated generally 74 and consisting of mold halves 75 and 76 is supported for rotary movement in the mold support 56 above described. Each of these mold halves is provided adjacent opposite ends with outstanding flanged ribs 77 which are received in the rabbeted grooves 66 and as illustrated in Fig. 9, these ribs are provided with external grooves 78 which communicate by means of a series of longitudinal and radial passages 79 and 80, respectively, with the interior of the mold. A split gear 81 surrounds the mold and meshes with a pinion 82 which is rotatably mounted on a shaft 83 supported in lugs 84 which are carried by the mold support above described. A drive pinion 85 (Fig. 8) loosely mounted on the shaft 83 and is provided with a flat face for frictional contact with the flat face on the pinion 82. A spring 86 urges the pinion 85 into frictional contact with the pinion 82 so that when the pinion 85 is driven, the pinion 82 will also rotate. Supported on a lug 87 on the opposite side of the mold support is a spring pressed rock arm 88 one end of which is adapted to engage in notch 89 formed in the mold while its opposite end carries a roller 90 for engagement with a stationary cam 91 carried by the frame of the machine.

In operation, assuming that the molds travel in the direction illustrated by the arrow in Fig. 5 and a hollow stream of glass 92 is flowing toward the machine, the molds will be brought into embracing position with relation to the glass stream. This is accomplished through the action of gravity for as the molds travel downwardly the natural tendency is for them to close and this closing action is controlled by the engagement of the rollers 72 with the cams 52, it being obvious that the shape of the cams 52 will determine the rapidity with which the mold halves move to closed position. As the rollers 72 leave the cams 52 the lugs 64 are brought into operative relation with the guide rails 48 so that the mold supports are held rigidly in closed position with the molds free to rotate in them. Simultaneously with the movement of the mold supports to closed position, the roller 90 engages the cam 91 so as to disengage the rock arm 88 from the notch 89, thus leaving the molds free to rotate within the mold supports. Simultaneously with the disengagement of the rock arm 88 from the notch 89, the pinion 82 meshes with the cylinder 51 and rotary motion is imparted by the cylinder to the molds. As the end of the cylinder 51 is approached, the roller 90 rides off of the cam 91 so as to permit the rock arm 88 to move under the influence of its spring into engagement with the periphery of the mold. Upon engagement of the arm 88 in the notch 89, rotation of the mold is arrested at the proper position for opening, it being understood that further movement of the drive pinion 85 by the cylinder 51 may proceed harmlessly due to the frictional contact of the pinions 82 and 85. Slightly beyond the end of the cylinder 51 and cam 91, the rollers 72 encounter the cams 53 and ride upwardly thereon to move the mold and mold support into open position so as to release the finished article. The molds are then carried around the sprocket at the end of the machine opposite that into which the glass is fed and remain in open position until they reach a point below the horizontal axis of the sprocket at the opposite end of the machine at which time they start to close and the operation is repeated. By connecting the passage 49 to an exhaust line it becomes evident that a reduced pressure will be created between the walls of the molds and the glass which is fed into them so that the latter will be expanded by air fed into the glass stream from either or both ends and the necessity of blowing air into the glass is dispensed with. Hence molds having closed ends and other modes of maintaining pressure may be dispensed with without sacrificing any of the advantages of producing ware by methods such as described. Moreover, accurately sized ware may be produced, irrespective of slight temperature changes in the glass which issues from the melting furnace.

It may be found desirable to have alternate molds rotate in opposite directions and to do this, it is obviously only necessary to introduce an additional pinion at some point between the cylinder 51 and the split gear 81, an operation which is well within the skill of any experienced mechanic.

While in the foregoing there has been shown and described the preferred embodiment of my invention, it is to be understood that minor changes in the details of construction, combination and arrangement of parts may be resorted to without departing from the spirit and scope of the invention as claimed.

What is claimed is:

1. Glass working apparatus which includes a mold for receiving a hollow mass of molten glass means for rotating the mold and means encircling the mold for exhausting the space between the glass and the walls of the mold.

2. Glass working apparatus which includes a mold for receiving a hollow mass of molten glass, means encircling the mold for exhausting the space between the glass and the walls of the mold and means for rotating the mold.

3. Glass working apparatus which includes means for issuing a hollow stream of molten glass, a mold receiving the stream means for rotating the mold and means encircling the mold for exhausting the space between the glass and the walls of the mold.

4. Glass working apparatus which includes a mold for receiving molten glass having an annular chamber, means for rotating the mold means encircling the mold for expanding the glass into the chamber and means for moving the glass through the mold to cause its expanded portion to contact with certain walls of the mold and be drawn to proper size as the mold rotates.

5. Glass working apparatus which includes means for issuing a hollow stream of molten glass, a mold receiving the stream, means encircling the mold for exhausting the space between the glass and the walls of the mold to cause the glass to conform to the shape of the mold, and means for rotating the mold.

6. Glass working apparatus which includes means for issuing a hollow stream of molten glass from a parent body, a mold receiving the stream, means encircling the mold for exhausting the space between the glass stream and the walls of the mold to cause the glass to conform to the shape of the mold, means for rotating the mold and means for severing the shaped glass from the parent body.

7. Glass working apparatus which includes means for continuously issuing a hollow stream of molten glass from a parent body, a mold receiving and shaping the glass stream, means for rotating the mold means encircling the mold for exhausting the space between the glass stream and the walls of the mold to cause the glass to conform to the shape of the mold, means for causing the shaped glass to leave the mold and means for severing the shaped glass from the parent body.

8. Glass working apparatus which includes a mold for receiving a hollow stream of molten glass and means encircling the mold for supporting it and exhausting the space between the mold and the glass stream.

9. Glass working apparatus which includes a rotary mold encircling a hollow stream of molten glass and means encircling the mold for supporting it and exhausting the space between the mold and the glass.

10. Glass working apparatus which includes a mold encircling a hollow stream of glass, said mold having an annular chamber intermediate its ends, and means encircling the mold for supporting it and exhausting the chamber.

JAMES BAILEY.